US006663081B1

(12) United States Patent
Arzouman

(10) Patent No.: US 6,663,081 B1
(45) Date of Patent: Dec. 16, 2003

(54) SAFETY MECHANISM FOR USE WITH A POWER UNIT AND A HYDRAULIC JACK

(76) Inventor: Harry H. Arzouman, 26 Mainsail Dr., Corona Del Mar, CA (US) 92625

( * ) Notice: Subject to any disclaimer, the term of this patent is extended or adjusted under 35 U.S.C. 154(b) by 0 days.

(21) Appl. No.: 10/153,944

(22) Filed: May 23, 2002

(51) Int. Cl.[7] .................................................. B60P 1/48
(52) U.S. Cl. ...................................................... 254/8 B
(58) Field of Search ................................ 254/8 B, 2 B, 254/124

(56) References Cited

U.S. PATENT DOCUMENTS

| | | | | | |
|---|---|---|---|---|---|
| 2,695,768 | A | * | 11/1954 | Lucker | 254/133 R |
| 2,998,224 | A | * | 8/1961 | Reisig | 254/8 R |
| 3,993,286 | A | * | 11/1976 | Greene et al. | 254/8 B |
| 4,251,056 | A | * | 2/1981 | Maniglia | 254/8 B |
| 4,289,299 | A | * | 9/1981 | Kameda | 254/8 B |
| 4,635,902 | A | * | 1/1987 | Chou | 254/8 B |
| 4,690,378 | A | * | 9/1987 | Jarman et al. | 254/8 B |
| 5,618,029 | A | * | 4/1997 | Chung | 254/8 B |
| 5,794,907 | A | * | 8/1998 | Bellia | 254/8 B |
| 5,878,996 | A | | 3/1999 | Loan | 254/8 B |

* cited by examiner

*Primary Examiner*—Robert C. Watson
(74) *Attorney, Agent, or Firm*—Roger C. Turner

(57) ABSTRACT

The specification describes a mobile jack stand power unit for use with a jack stand that is convertible for use as a load-lifting jack. The power unit comprises a generally rectangular mobile chassis having a forward end and a rearward end with a lift means mounted on the chassis including a pushing means, and a pair of parallel lift arms. The lift arms are pivotal within the chassis and have forward ends and rearward ends, with the forward ends adapted to be raised and lowered by the pushing means for use with the jack stand, and are further adapted for use with a lift bridge. A lift bridge is adapted to be positioned on the forward ends of the lift arms whereby the power unit is operable for use as a load-lifting jack; and the bridge is further adapted to be displaced from the forward ends of the lift arms whereby the power unit is operable for use with the jack stand. The specification further discloses the bridge, a forgeable one-piece lift arm assembly, a leveling pad for the forward ends of the lift arms, and a safety securing mechanism for securing the rearward ends of the lift arms independent of any force from the pushing means.

7 Claims, 7 Drawing Sheets

SAFETY MECHANISM FOR USE WITH A POWER UNIT AND A HYDRAULIC JACK

CROSS REFERENCE TO RELATED APPLICATIONS

Applications have also been filed directed to a power unit convertible into a jack, a lift bridge, a lift arm assembly, and leveling pads, as described in the present specification.

BACKGROUND OF THE INVENTION

The invention relates to a device for lifting and supporting an object i.e. a corner of an automobile; particularly to a two part jacking system including a power unit that can be used to place and elevate a jack stand. The inventor of the present invention is a pioneer of the two part jacking system holding numerous issued patents for a two part jacking system and related products and processes as described below.

Briefly, the two part jacking system consists of a power unit and a set of separate mechanical jack stands. Examples of the two part jacking system and power unit are described in detail in U.S. Pat. No. Re. 32,715 and U.S. Pat. No. 4,589,630. Some examples of the jack stands are described in detail in U.S. Pat. Nos. 4,553,772; 4,490,264; 5,110,089; 5,183,235 and 5,379,974. The stands are capable of being vertically extended and retracted from the garage floor or road surface and, when extended, can be locked in place at any desired position by a ratchet and pawl assembly. The power unit has a mobile chassis adapted to carry a plurality of the jack stands, and has a pair of lift arms adapted to mate with the outermost jack stand for placement and removal.

In use, the mobile power unit is operated entirely from its handle. It is maneuvered under a vehicle to place a jack stand in a desired location for lift and supporting the vehicle. The power unit is activated from the handle, and this jack stand is then vertically extended to the desired height, thus lift the vehicle on the stand. By operating the controls at the end of the handle, the operator can cause the power unit to disengage from the stand, and the stand will remain locked in its extended supporting position under the vehicle. In this manner, the vehicle is raised and supported on a separate mechanical stand without transferring the vehicle from a jack to a stand and without the operator placing any part of his body under the vehicle or having to touch the stand itself. After the stand is raised and locked in place to support the vehicle or other load in a lifted position, the power unit lift arms are lowered and the power unit is disengaged from the stand and pulled away, leaving the stand in position supporting the load. Another jack stand, carried within the chassis, is automatically transferred to the forward end the chassis for placement at another desired location of the vehicle or for use to lift and support another vehicle.

To lower the vehicle and remove the stand, the power unit is maneuvered to reengage with the stand. The engagement causes any existing jack stands carried within the chassis to be automatically transferred rearward within the chassis. By manually operating a control at the end of the handle, the user can cause the power unit to reengage with the stand, and to disengage the ratchet locking mechanism of the stand and lower the stand to its original position. The power unit remains engaged with the stand and can be pulled away from the vehicle with the stand carried within the chassis.

The original power units were adapted to carry one or two jack stands within the chassis for consumer use; and up to four jack stands within the chassis for commercial use. Additional jack stands could be purchased and arranged at various stations on the garage floor to reload the power unit, so that a single power unit could be utilized to efficiently place and actuate numerous jack stands. However, it was found that many commercial users would utilize all of their available jack stands, and the power unit was thereafter useless until another jack stand was available to be extracted and reused. It was determined that it would be highly desirable if the power unit could also function as a lift device when no jack stands were available, and when the power unit was separated from the source of jack stands.

It was also discovered that consumer projects usually required only two supports, and it was determined that it would be highly desirable to have a consumer system consisting of one jack stand and a power unit that could also be utilized as a lift and supporting device.

It was also discovered that commercial users routinely provide emergency field service, and the weight and extended chassis length (for carrying four jack stands) was somewhat unwieldy and difficult to be loaded, transported and maneuvered for such emergency field services. It was determined that it would be highly desirable to have a compact commercial power unit for shop use; and that could also efficiently be used as a stand alone lift and supporting device, as well as a power unit for use with a jack stand, for such field service.

The two part system efficiently and effectively eliminates the need to use a cumbersome hydraulic floor jack as a jack stand. However, some consumer and even professional users carelessly and hastily use the hydraulic jack as a supporting device until the project is completed. Hydraulic jacks have suffered from the disadvantage of hydraulic bleed, making performance in supporting a load over an extended period of time, unpredictable and hazardous for the user. It was determined that it would be highly desirable to provide a hydraulic lift device with a reliable mechanical mechanism for securing the lift arm so that it would support the load even upon hydraulic bleed or other failure of the hydraulic lift system.

In view of the foregoing problems and desirable features of a two part lift and supporting system, it is an object of the present invention to provide a power unit for use with a jack stand, that is readily convertible for use directly as a load-lifting jack.

It is another object to provide a power unit that is automatically adapted for use with a jack stand when engaged with a jack stand, and automatically adapted for use as a load-lifting jack when not engaged with a jack stand.

SUMMARY OF THE INVENTION

The foregoing objects are accomplished by a safety mechanism and a hydraulic floor jack including a generally rectangular chassis having a forward end and a rearward end and a left flange and tight flange extending upwardly from the chassis. Each flange has a longitudinal retaining slot extending horizontally from the rearward end to about midway along the flange. The chassis has a lift arm assembly including a left lift arm and a right left arm acting in parallel having forward ends and rearward ends and interconnected near the midpoints thereof by a lateral pivotal push bar. The rearward ends of the lift arms are connected by an axel slidably retained within the longitudinal slots in the flanges.

The lifting device includes a left connecting arm and right connecting arm acting in parallel having forward ends and rearward ends. The forward ends of the connecting arms are pivotally connected near the forward end of the respective flange. The rearward end of the connecting arms are pivotally connected near the midpoint of the respective lift arm.

A hydraulic actuator provides the lift and has a rearward end pivotally mounted at the rearward end of the chassis, and has a forward end attached to the lateral pivotal push bar. The hydraulic actuator is adapted to be extendable whereby the forward ends of the lift arms are raised and the rearward ends of the lifting arms are translated forward along the longitudinal slots of the flanges.

The safety mechanism comprises a toothed rack bar and a mechanical dog. The toothed rack bar extends horizontally within the chassis and is adjacent to the longitudinal slots in the flanges. The mechanical dog is pivotally mounted on the axel interconnecting the rearward end of the lift arms, and is adapted to be engagable with a corresponding tooth of the rack bar. The engagement of the dog in the rack bar mechanically secures the rearward end of the lift arms to the chassis, independent of any force of the hydraulic actuator. The dog further is adapted to be releasable from the rack bar so that the rearward end of the lift arms can be translated rearward, to facilitate lowering the jack.

A tension spring is advantageously utilized in the release linkage of the safety mechanism so that the dog is not released until the lift arm is pushed slightly forward, for an additional safety feature. The safety mechanism can be adapted to various configurations of floor jacks and can have a variety of suitable lever and cable release mechanisms.

BRIEF DESCRIPTION OF THE DRAWINGS

While the novel features of the invention are set forth in the appended claims, the invention will be better understood along with other features thereof from the following detailed description taken in conjunction with the drawings, in which:

DETAILED DESCRIPTION OF THE INVENTION

The Figures and the following specification may describe and define several distinctive inventions that are interrelated within a lifting and supporting system, and may be included in divisional patents (or pending applications) having distinctive sets of claims directed to the respective invention. Also, the power unit and jack stands are discussed and described in terms of an automotive jack system, but it should be understood that the system is not limited to automotive uses and can be utilized for lifting and supporting any type of load.

Power Unit Convertible Into A Load-Lifting Jack

Figure 1:
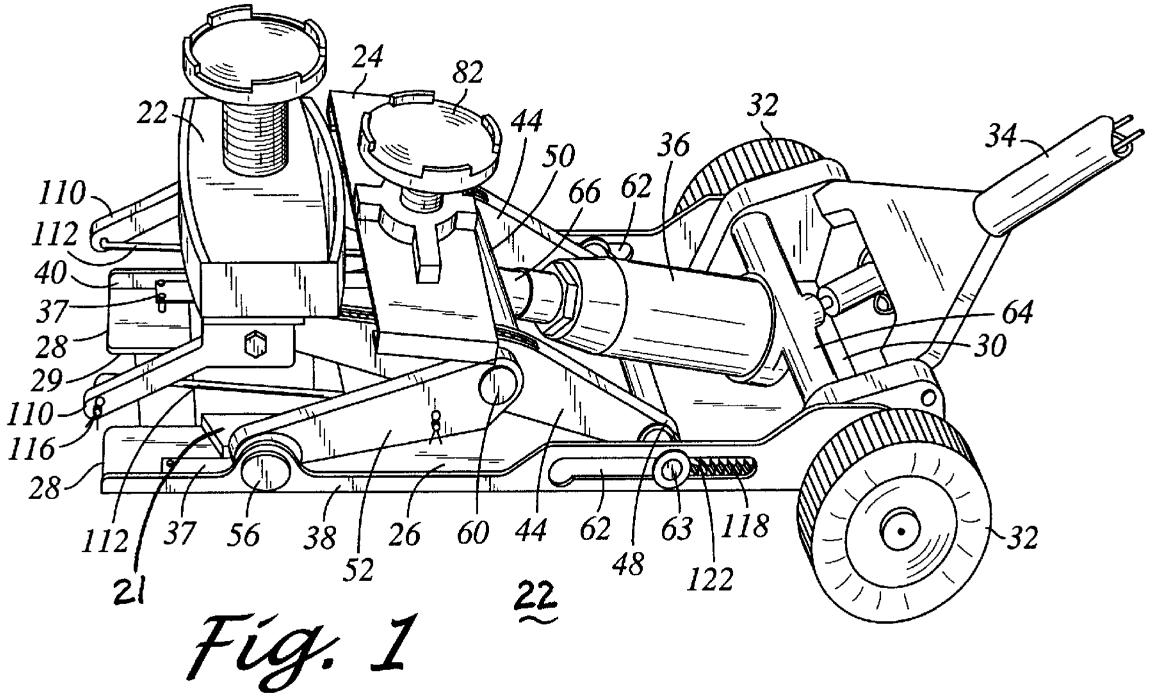
FIG. 1 is perspective view of the present invention, showing a power unit for use with a jack stand positioned within the chassis, and a bridge displaced rearward and not in use.
Figure 2:
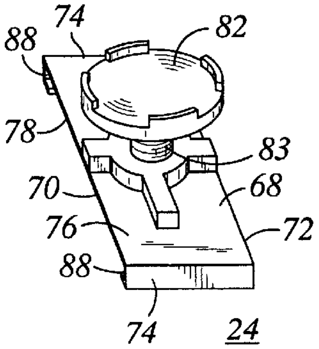
FIG. 2 is a perspective view of the bridge of the present invention.
Figure 3:
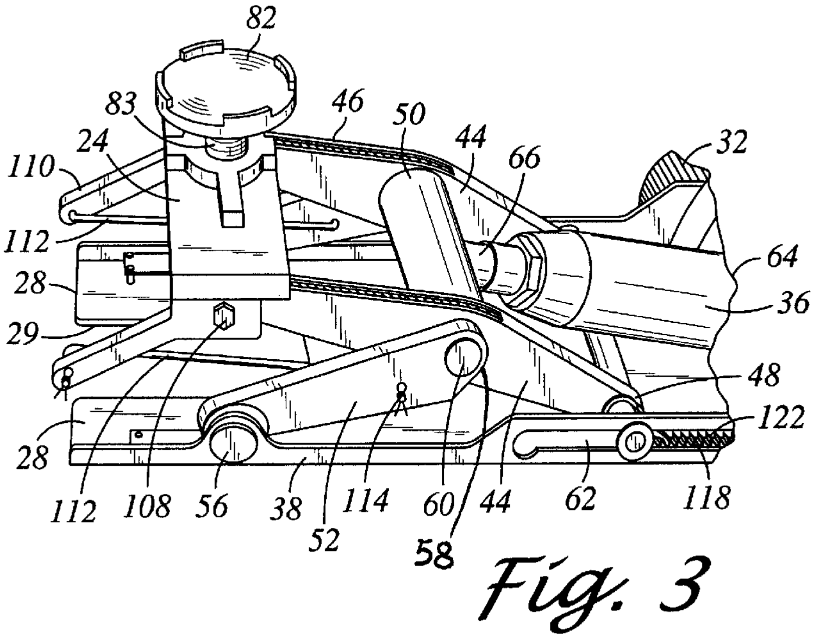
FIG. 3 is a perspective view, similar to FIG. 1, showing the power unit utilizing the bridge positioned forwardly for use as a jack.
Figure 4:
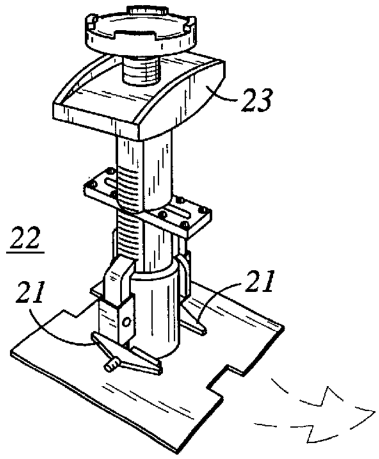
FIG. 4 is a perspective view of a typical jack stand (in an elevated position) that can be positioned, elevated and lowered by the power unit of FIG. 1.

Referring first to FIGS. 1–5, there is illustrated a mobile power unit 20 of the present invention for conventional use with a jack stand 22 (see FIG. 4), that is readily convertible for use as a load-lifting jack by a lift bridge 24. The bridge is shown in FIG. 1 on the power unit in a displaced inoperative position; and is shown in FIG. 3 in the forward position to convert the power unit for use as a load-lifting jack. The lift bridge is a key element and feature of the present invention, and is shown separately from the power unit in FIG. 2.

The power unit includes a generally rectangular mobile chassis 26 having a forward end 28 primarily for receiving, placing and retrieving the jack stand 22, and a rearward end 30 including a pair of wheels 32 for providing mobility and maneuverability for the chassis by a handle assembly 34. The jack stand 22 includes a base having a pair of engagement lugs 21 and enclosing means for releasing the telescopic ratcheting ram of the jack and a lift collar 23 for lifting the ratcheting ram by the power unit. The forward end 28 of the chassis has a "U" shaped opening 29 adapted to slide over the base of the jack stand 22 and under the engagement lugs 21 to carry and control the jack stand. The chassis includes a jack actuation mechanism 37 for engagement with the lugs 21 of the jack stand, to control the lifting and lowering of the jack stand. The handle assembly is also used to control and pump a hydraulic actuator 36 at the rearward end of the chassis and to actuate the mechanisms 37, at the forward end of the chassis, to control the engagement, release and elevation of the jack stand, as fully described in the prior art patents enumerated in the BACKGROUND OF THE INVENTION. The handle assembly is also used to actuate a release of a locking safety device to be described later in detail. The chassis includes a left flange 38 and a right flange 40 extending generally vertically upward from the sides of the chassis for supporting a lift arm assembly 42.

The lift arm assembly (see also FIG. 10) includes a pair of left and right lift arms 44 acting in parallel having forward ends 46 and rearward ends 48 and interconnected near the midpoints thereof by a lateral push bar 50, and is adapted to be nested on the chassis 26. A pair of connecting arms 52 acting in parallel and having forward ends 54 is pivotally connected to the respective flange 38,40 with a suitable shoulder rivet fastener 56, and having rearward ends 58 connected to the respective lift arm (near the midpoint thereof) and sharing a common axis 60 with the push bar. The chassis further includes a longitudinal retaining means, illustrated as a pair of generally horizontal slots 62 extending from near the rearward end of the respective flange to about the midpoint thereof (a distance otherwise corresponding to the range of travel of the rearward end 48 of the lift arm). The rearward ends of the lift arms are interconnected by an axel 63 that is slidably retained within the respective slot of the respective flange; with the forward ends of the lift arms 46 extending freely toward the forward end of the chassis. The longitudinal retaining means can alternatively be provided in the chassis by a suitable horizontally extended upper flange, a channel, or upper rack and pinion mechanism, etc. in alternative embodiments.

The hydraulic actuator 36 has a rearward end 64 pivotally mounted to the rearward end of the chassis (see FIG. 1) and has a forward ram end 66 attached to the lateral push bar 50. When the actuator is extended, the forward ends 46 of the lift arms 44 are raised (by upward rotation of the connecting arm 52) and the rearward ends 48 of the lift arms with the axel 63 are translated forward along the slots 62 in the respective flange. In a preferred embodiment, the length of the connecting arms 52 are about half the length of the lift arms; and they are pivotally connected near the center of the lift arm, whereby the forward ends of the lift arms are elevated substantially vertically by the rotation of the connecting arm during the entire range of the lifting operations.

The Lift Bridge

Figure 5:
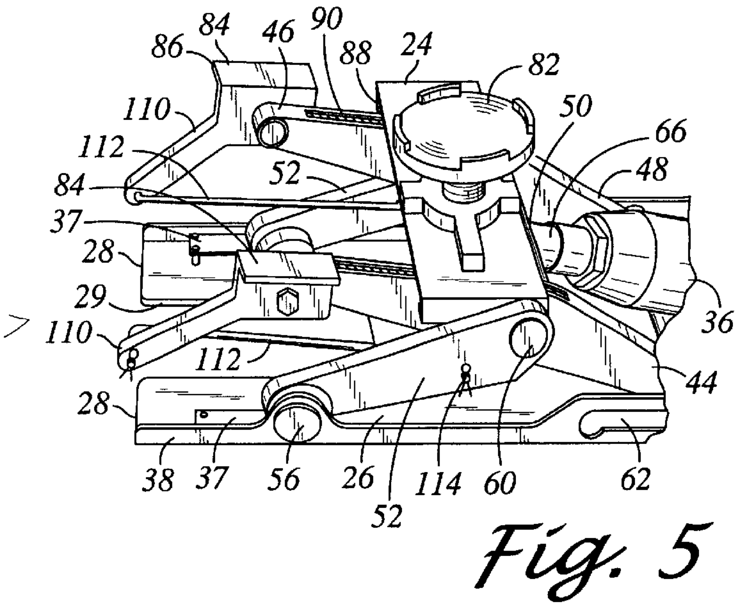
FIG. 5 is a perspective view, similar to FIG. 1, showing the bridge displaced toward the rearward ends of the lift arms to show the forward ends of the lift arm assembly.

The lift bridge 24 is illustrated as a separate component in FIG. 2, and shown on the power unit in FIGS. 1, 3 and 5, as a generally rectangular load bearing plate 68 oriented horizontally and having a forward end 70, a rearward end 72, left and right sides 74, a top surface 76 and a bottom surface 78. The bridge is adapted to be positioned on the forward ends 46 of the lift arms 44 "to Bridge the open span between the lift arms", so that the power unit 20 can then be convertible for use as a load-lifting jack. As discussed in the BACKGROUND OF THE INVENTION, The power unit has heretofore been utilized only for use to engage the lift collar 23 of a jack stand 22 and for placing, lifting and retrieving the jack stand. It is readily understood from FIG. 3 that actuation of the hydraulic actuator 36 would raise and lower the load bearing lift bridge 24, along with the lift arms, for use of the power unit as a hydraulic lifting jack, to greatly expand and enhance the utility of the power unit. The bridge typically, but not essentially, includes a screw-out load bearing saddle plate 82. The saddle plate including a large threaded shaft 83 extending vertically downward therefrom, and adapted to engage a corresponding threaded aperture in the center of plate 68 of the bridge. Such screw-out saddle plates have been utilized in conventional jacks and are adjustable (up to about six inches) to compensate for the variable clearance heights (i.e. the clearance at the lift point for a low sports car, and the clearance at the lift point of a pickup truck) to further increase the utility of the load-lifting jack of the present invention.

A basic embodiment of the lift bridge 24 is a simple plate that is adapted to be positioned by hand by the user into the desired position on the forward ends of the lift arms 44. The forward ends 46 of the lift arms include members adapted to engage the bottom surface or sides of the bridge. A suitable member is shown (see FIGS. 5 and 10) as leveling pad 84 having a horizontal guide flange 86. The bridge further includes suitable channels 88 formed into the inner sides thereof and adapted to engage the guide flanges 86 when the bridge is properly positioned on the forward ends of the lift arms. When it is desirable to convert the power unit back for use with a jack stand, the bridge is readily displaced from the forward ends of the lift arms and stored conveniently at a rearward position on the lift arm (as shown in FIGS. 1 and 5), or alternatively stored at the handle assembly 34, or removed entirely from the power unit.

The lift bridge 24 is efficiently produced by a metallic casting incorporating the desired recesses and flanges, as well as any other desired features, i.e. a central aperture therein with suitable reinforcing boss, or strengthening ribs or gussets for added strength or for other specific applications. The basic bridge, positioned by the operator, is incorporated into efficient new products; however, it is particularly useful as an accessory for retrofitting the numerous power units currently in use with jack stands, to be convertible for use as load-lifting jacks.

During initial development and experimental use of the lift bridge, it was discovered that an unattached bridge was sometimes misplaced, and sometimes required extra time and effort to properly position and remove the bridge during alternate jack stand/lifting jack operations. Continued development resulted in a preferred embodiments in which the bridge is slidably retained within guide tracks extending along the upper surface of the lift arms, so that the lift bridge is integral with the power unit and can be readily positioned by hand into the forward position and alternatively into the displaced position while retained within the tracks of the lift arms. A more preferred embodiment further includes a forward biasing means (i.e. a suitable elastomeric member or a suitable compression spring) so that the lift bridge is automatically urged into a slide forward position on the lift arms whenever a jack stand is not engaged within the chassis; and further, so that the presence of a jack stand within the chassis will automatically push the lift bridge rearward (overcoming the forward bias of the spring) along the lift arm to a displaced position.

The Lift Arm Assembly-Automatic Slide Forward Bridge

Figure 6:
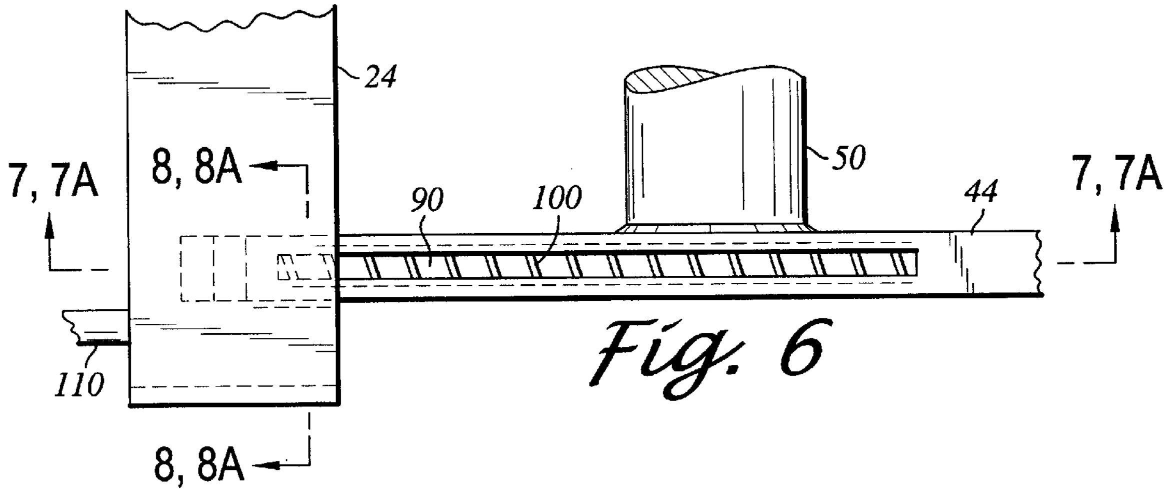
FIG. 6 is a top plan view of a portion of a lift arm for use with an automatically forward positioned bridge.
Figure 7:
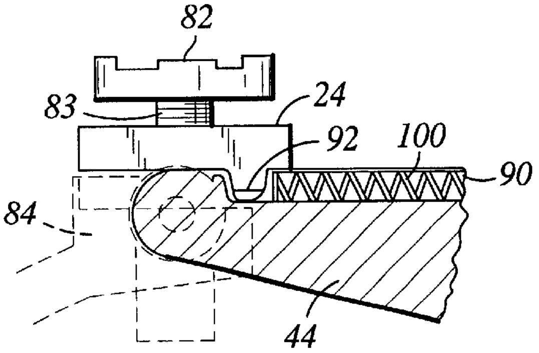
FIG. 7 is a sectional view taken along 7—7 of FIG. 6, and showing a first embodiment of the automatically forward positioned bridge on the forward end of the lift arm.
Figure 8:
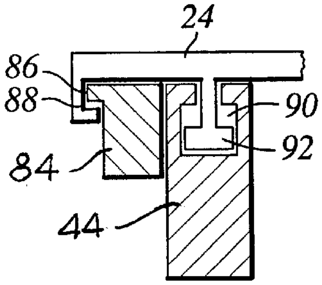
FIG. 8 is a sectional view taken along 8—8 of FIG. 6, showing the first embodiment of the bridge supported on leveling pads at the forward end of the lift arms.
Figure 7A:
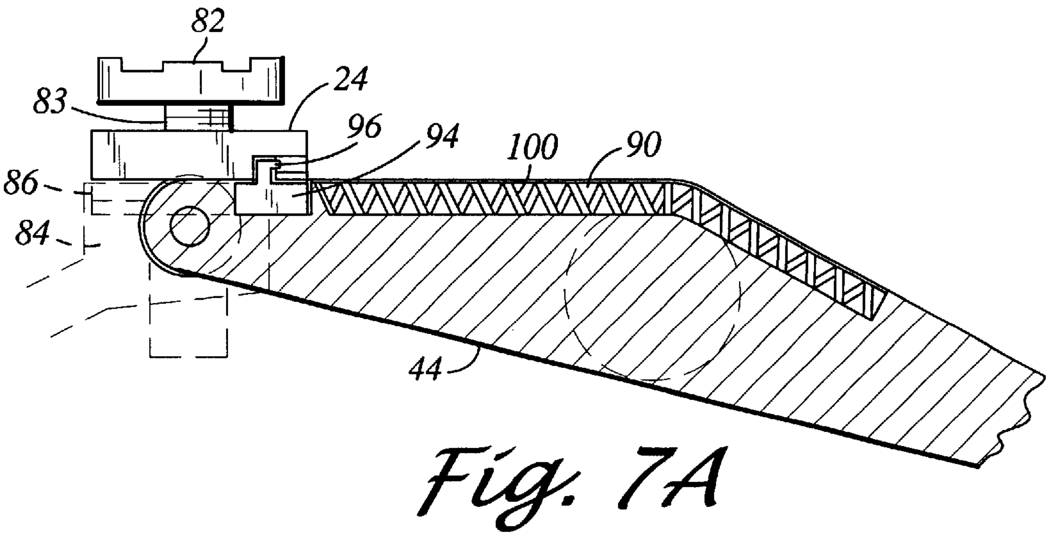
FIG. 7A is a sectional view taken along 7A—7A of FIG. 6, and showing a second embodiment of the automatically forward positioned bridge on the forward end of the lift arm.

Referring also to FIGS. 6–8, a first embodiment of the lift bridge 24 is described in which the lift arms 44 include upper guide tracks, shown as recessed channels 90 extending from the forward ends thereof to a rearward location past the midpoint thereof (past the attachment of the lateral push bar 50). The bridge includes a pair of guide members 92 extending downward from the rearward bottom surface thereof and adapted to fit within the recessed channels of the tracks. The guide members 92 and recessed channels 90 each have suitable shapes to retain the rearward end of the bridge loosely within the guide tracks, and are adapted to facilitate the traverse of the bridge along the upper surface of the lift arm. As shown in FIG. 8, a suitable shape of the guide member 92 of the bridge is an inverted "T" that is retained within a "C" shaped recessed channel 90 of the lift arm. The recessed channel typically extends completely through the forward end of the lift arm for the initial insertion of the guide members into the channel, and is thereafter confined within the track by a fastener that secures the lift pad (and closes the forward end of the channel). This retention means can operate smoothly with very loose tolerances and is quite rugged and reliable within the garage environment. A variety of complementary engaging shapes can be suitable adapted for this type of retention means. The bridge is retained by the engagement of the guide members 92 within the recessed channels 90 whenever the bridge is displaced rearward along the lift arm. The bridge remains integral with the lift arms and functions quite smoothly by hand manipulation from the forward position to the displaced position.

Figure 8A:
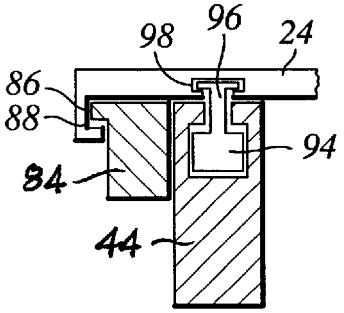
FIG. 8A is a sectional view taken along 8A—8A of FIG. 6, showing the second embodiment of the bridge supported on leveling pads at the forward end of the lift arms.

Referring now to FIGS. 6, 7A, 8A and 9, another embodiment of the bridge 24 is described in which the lift arms 44 include upper guide tracks, again shown as recessed channels 90 extending from the forward ends thereof to a rearward location past the midpoint thereof The guide tracks each have a suitable shape and internal surface to retain a follower member 94, with the follower member having a guide pin 96 extending upward from the opening of the channel and adapted to traverse along the upper surface of the lift arm. As shown in FIG. 8A, the follower member 94 has a suitable inverted "T" cross section retained within a "C" shaped recessed channel 90. The bridge further includes a pair of recessed slots 98 in the rearward bottom thereof adapted to engage the guide pins 96 to facilitate movement of the lift bridge along the track from the forward position to the displaced position. As also shown in FIG. 8A, the guide pins 96 have a suitable "T" shape adapted to fit within a suitable "C" shape of the recessed slots 98 in the bottom of the bridge. The inverted "T" shape of the follower member and the "T" shape of the guide pin form a generally "T" shaped cross section of the follower member to suitable interconnect the bridge within the recessed channel. The bridge is retained by the engagement of the guide pins 96 of the follower member and the recessed slots 98 whenever the bridge is displaced rearward along the lift arm. When the bridge is transferred to the forward end of the lift arms, the side channels 88 of the bridge slide over the guide flanges 86 of the leveling pads 84 until the bridge is fully positioned thereon. This follower member, guide pin, recessed slot, retention means is similarly operable with loose tolerances, and is rugged and reliable in the work environment. With the foregoing components, the lift bridge remains integral with the lift arms and functions quite smoothly by the hand manipulation from the forward position to the rearward displaced position on the power unit.

Referring now to FIGS. 6, 7, 7A and 9, the more preferred embodiments are described wherein the upper recessed channels 90 further include biasing means, shown as compression springs 100 to urge the respective guide member 92 or follower members 94 to the forward ends of the channels of the lift arms. Thus, the lift bridge 24 is automatically urged to the forward ends of the lift arm; and conversely, a force on the forward end 70 of the lift bridge pushes the respective guide member or follower member rearward within the channel to compress the spring. The compression springs are adapted to provide sufficient force to position the bridge at the forward ends of the lift arms (when the lift arms are in a generally horizontal orientation), and further adapted to be readily compressible by the routine engagement of the forward end of the bridge with a base or lifting pad of a jack stand 22 within the forward end of the chassis. The springs 100 are suitably inserted into the channels 90 at the forwards end thereof, prior to insertion of the respective guide member 92 or follower member 94.

Figure 11:
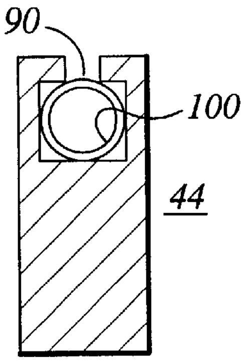
FIG. 11 is a sectional view taken along 11—11 of FIG. 10, showing a recess and a compression spring within a guide track of the lift arm.
Figure 12:
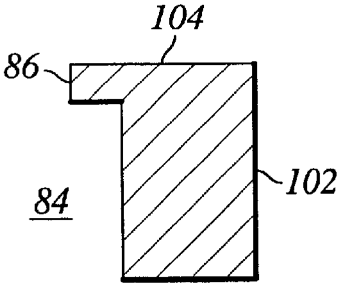
FIG. 12 is a sectional view taken along 12—12 of FIG. 10, showing the leveling pad.

The springs 100 are retained within the channels 90 (see also FIG. 11) and automatically expanded to the full span of the channel (see FIGS. 6, 7 and 7A) along with the respective guide members 92 or follower members 94, whenever there is no jack stand 22 positioned within the chassis of the power unit, as in FIGS. 3 and 7. The power unit with the automatic slide forward bridge positioned at the ends of the lift arms is thus automatically converted for use as a lifting jack.

Figure 9:
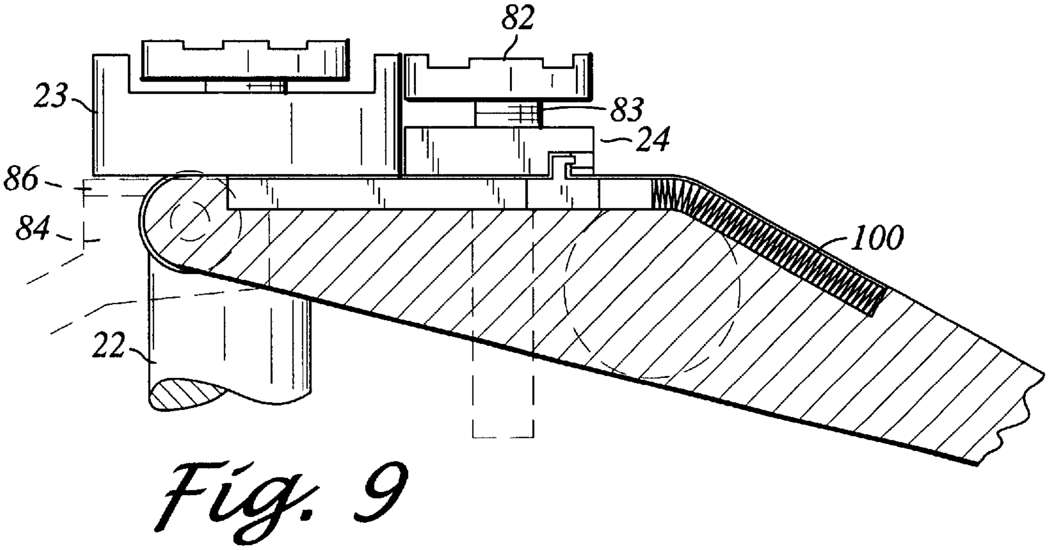
FIG. 9 is a sectional view, similar to FIG. 7A, and showing the bridge pushed toward the rearward end of the lift arms (automatically) by the jack stand.

The springs 100 are shown fully compressed within the channels in FIG. 9, by the engagement of the jack stand 22 and correspond to the power unit shown in FIG. 1. The power unit with the automatic slide forward bridge forced rearward by the engagement of a jack stand, is thus automatically converted for use with the jack stand.

The foregoing left lift arm, right lift arm and lateral push bar are efficiently manufactured as a single integral casting to form the lift arm assembly 42. The guide track recessed channels 90 are also efficiently and reliably directly formed into the casting. This casting assures reliable precise alignment of the lift arms and push bar, and further assures high strength and durability of the assembly. The assembly can be completed with minimum machining of the apertures and interactive surfaces, for final assembly with the mating components.

Leveling Pads

It is highly desirable for the forward ends of the lift arms to maintain a uniform generally level platform (parallel with the chassis) throughout the lifting operation. This is important for proper engagement of the forward ends of the lift arms 44with the lift collar 23 of the jack stand 22 for use as a power unit; and also for engagement of the lift arms with the bridge 24 for level contact with the object to be lifted, for use as a jack. Basic leveling means can be incorporated, i.e. a spherical (or circular) ball and socket engagement between the pairs of components that permits relative rotation with changes in the angle of the lift arms. Another example of a basic leveling means can include a pivotal member having a heavy weight extended downward that tends to remain plumb during changes in the angle of the lift arms.

Figure 10:
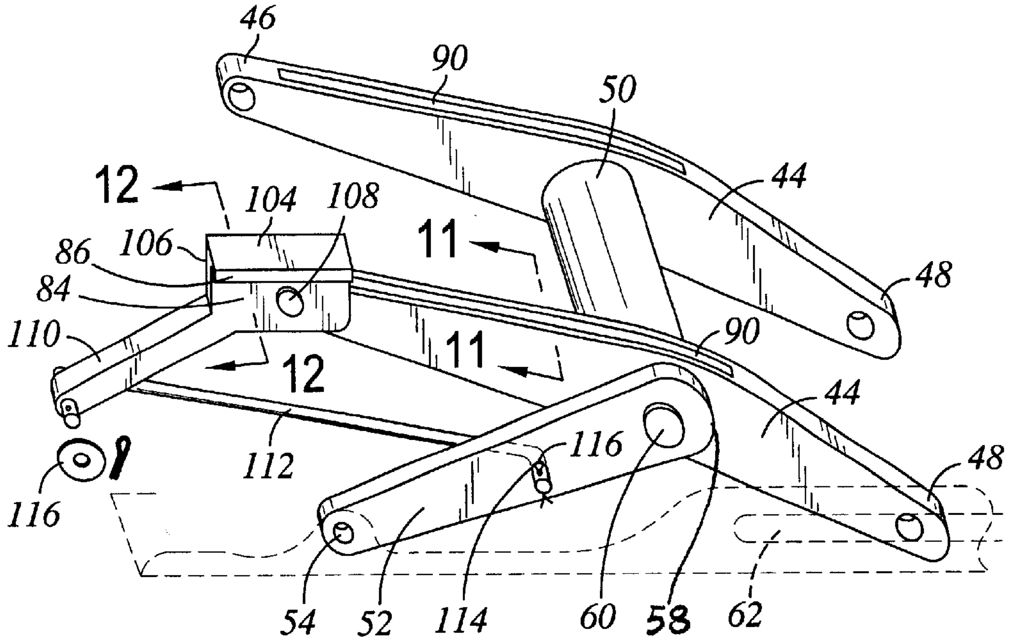
FIG. 10 is a perspective view of selected components of the power unit of FIG. 1, showing the lift arm assembly, a leveling pad and a connecting arm.

Referring particularly to FIGS. 3, 5, and 10, a preferred embodiment of a leveling means is shown that includes the pair of leveling pads 84 attached to the outer side of the forward ends 46 of the lift arms 44. The leveling pad comprises a vertically oriented rectangular plate 102 having an upper surface 104 aligned with the upper surface of the lift arm, a forward end 106 and a central horizontal aperture therein pivotally attached coaxial at 108 with an aperture of the respective lift arm. As previously discussed, the leveling pad further includes a guide flange 86 extending horizontally from the upper surface thereof and adapted to engage the respective channel 88 in the inner side of the bridge. A lever arm 110 extends forward and downward from the plate, and has a length corresponding to the length of the pivotal connecting arm 52. A pair of connecting rods 112 interconnects the end of the lever arms to a point 114 on the pivotal connecting arm 52, so that as the angle between the forward portion of the lift arm and the connecting arm increases, the angle between the lift arm and the lever arm 110 decreases so that the upper surface of the leveling pads remains horizontal during the entire ranged of elevation of the lift arm. The connecting rod 112 does not carry any significant load and is used only to rotate the leveling pads and is thus a relatively small member that is retained by suitable washers and cotter pins 116.

In an initial concept, the leveling mechanism was designed with the forward portion of the lift arm in a level orientation, with the lever arm 110 extending downward at an angle corresponding to the angle of the connecting arms 52 (about 20 degrees). The mechanism was conceived to operate as a parallelogram having the length of the connecting rods 112 equal to the distance from the aperture 108 to the common axis 60 of the lift arm; and the distance from the common axis 60 to the connection point 114 on the connecting arms 52 to be equal to the length of the lever arm 110. However, in an initial embodiment, it was necessary to slightly modify the component relationships to empirically perfect the desired level platform. In the example of the embodiment, the length of the lift arm 44 is about 12 inches, the distance from the aperture 108 to the common axis 60 is about 5.50 inches, the length of the lever arm 110 is about 2 inches, the connecting point 114 is about 1.05 inches from the common axis 60, and the connecting rods are about 6.25 inches in length. Although the concept of the parallelogram is believed to have merit, the above relative lengths and connection points are suitable to produce the desired level platform on the lift arm and can be proportioned for other embodiments having lift arms with a different length.

This leveling mechanism was developed in conjunction with the power unit and bridge for use as a jack. However, it should be understood that this feature is adaptable to all conventional floor jacks and pivotal linkages.

Safe Jack Securing Mechanism

As discussed in the BACKGROUND OF THE INVENTION, a hydraulic jack is dependent upon a series of fluid valves and seals and carefully aligned piston and ram components. With time or excessive use, these seals tend to leak fluid and loose hydraulic pressure known as "hydraulic bleed" and the jack becomes unreliable and unsafe. In spite of excessive use and wear, some hydraulic jacks can function in the dynamic mode with repeated pumping to extend the ram, and can lift a load; however, without the repeated pumping of the actuator, the ram can not sustain a static load for an extended period of time, without a block or mechanical stand, and the jack fails to support the load.

Another feature of the present invention is a hydraulic floor jack that includes a mechanical securing mechanism that converts the jack into a safe mechanical jack stand. This mechanism was developed in conjunction with the power unit and bridge for use as a safe jack, and for a safe jack stand. However, it should be understood that this feature is adaptable to all conventional hydraulic floor jacks.

Figure 13:
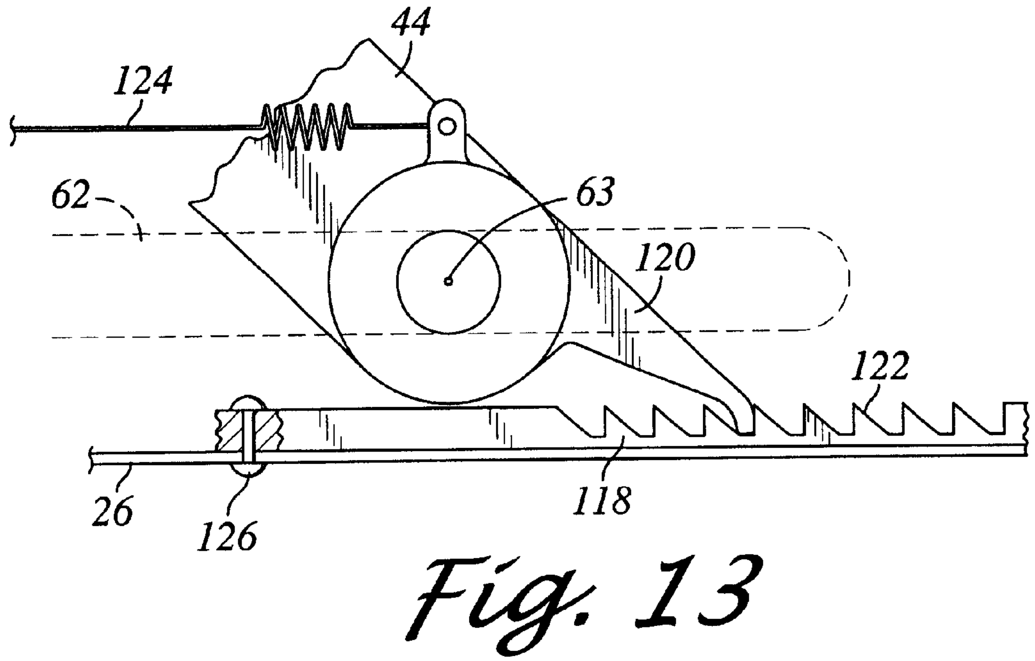
FIG. 13 is a side elevational view of the rearward end of a lift arm showing a means for securing the rearward end of the lift arm, engaged so that a hydraulic jack can be safely used as a jack stand.
Figure 14:
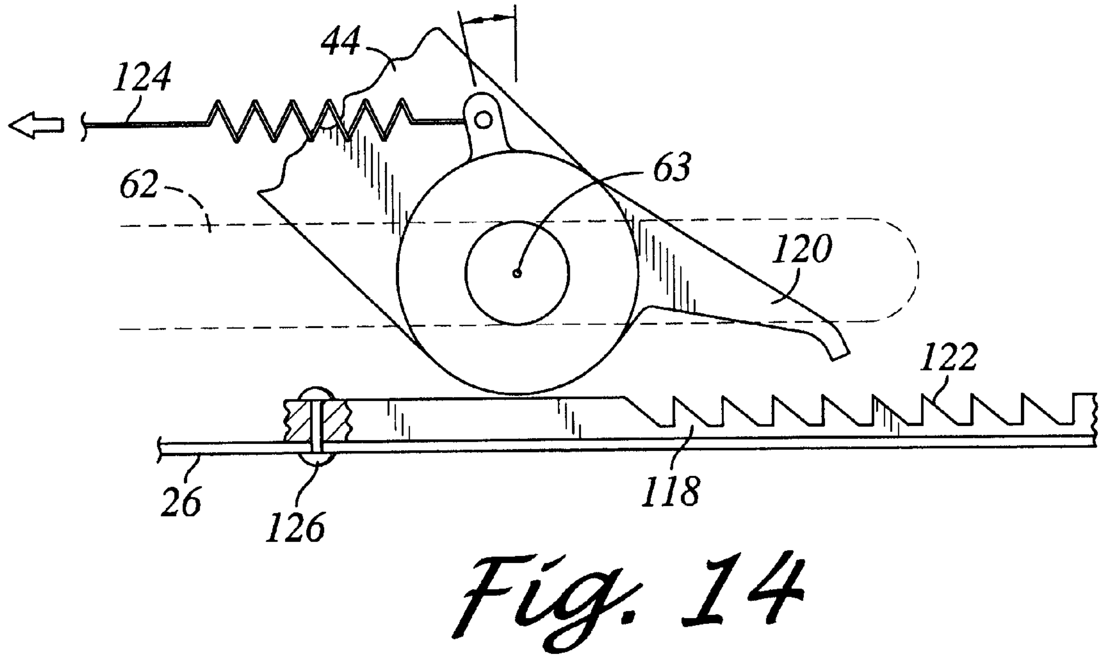
FIG. 14 is a side elevational view, similar to FIG. 12, showing the means for securing the rearward end of the lift arm in the disengaged position.

Referring now to FIGS. 1, 13 and 14, a basic embodiment of a safe securing mechanism is shown in which the lift arm assembly is extended by the hydraulic actuator 36 and the rearward ends of the lift arms 44 and axle 63 are translated along the chassis within the retaining slots 62 in the flanges of the chassis, as previously discussed. The securing mechanism comprises a toothed rack bar 118 extending horizontally along the chassis and adjacent to the retaining slot; and a mechanical dog 120 pivotally mounted on the rearward end 48 of the lift arm and adapted to be engageable with a corresponding tooth 122 of the rack bar. The securing mechanism can function by securing only one of the rearward ends of the lift arms, but preferably is adapted to secure both of the rearward ends of the lift arms for balance of the loads and as an added safety factor for the lifting and supporting device.

The rack bar is typically formed of steel plate or casting about 0.5 inches wide and extends the length of the slot. The bar does not require welding and is efficiently attached to the base of the chassis with conventional rivet fasteners 126. The teeth 122 are typically evenly spaced and can have a variety of suitable shapes, however the teeth are preferably inclined toward the forward end of the chassis. The dog is suitably formed from a steel plate or casting and the weight of the extended dog is naturally forced by gravity onto the toothed bar. The engagement of the dog with the toothed bar can be further ensured by a coaxial torsion spring (not shown) exerting downward pressure on the dog. The dog is thus adapted to be engaged with a corresponding tooth of the rack bar at all times (unless intentionally disengaged), to mechanically secure the rearward ends of the lift arms to the chassis independent of any force of the hydraulic cylinder on the lift arm.

It is readily seen in FIG. 13 that any downward force on the lift arm (by a failed hydraulic actuator) which would tend to push the rearward end of the lift arm (to the right in FIG. 13) would be securely locked by the engagement of the dog within a corresponding tooth of the bar, whereby the hydraulic jack can be operable for use as a safe jack stand that can not fail. The forwardly inclined teeth of the bar and the weighted (or torsion sprung ) engagement of the dog, allows the lift arm to ratchet forward within the slot as the lift arm is raised upward (to the left in FIG. 13), but securely lock against any downward movement (to the right in FIG. 13), unless the dog is actuated into the disengaged position as shown in FIG. 14.

The dog of the securing mechanism can be actuated to be engaged or disengaged by suitable latches, detent means, cables and linkage (not shown), directly by an operator. Preferably, the dog further includes a spring release linkage 124, shown in FIGS. 13 and 14, at the upper periphery of the dog that can be operated from the handle assembly 34 to release the securing means from the lift arm. The shape of the dog and teeth are preferably designed so that any rearward force on the lift arm forces the dog to be securely locked into the tooth of the bar. To release the mechanism, the linkage is actuated and the tension spring exert a rotational torque on the dog; however, the dog can not be actually disengaged until the force of the load is relieved from the dog, by slightly extending the actuator and raising the lift arm. The securing mechanism is released when not needed to secure the jack and is naturally released when the job is completed and the jack is intentionally lowered and removed.

Securing Mechanism Adapted to the Power Unit with Bridge

Figure 15:
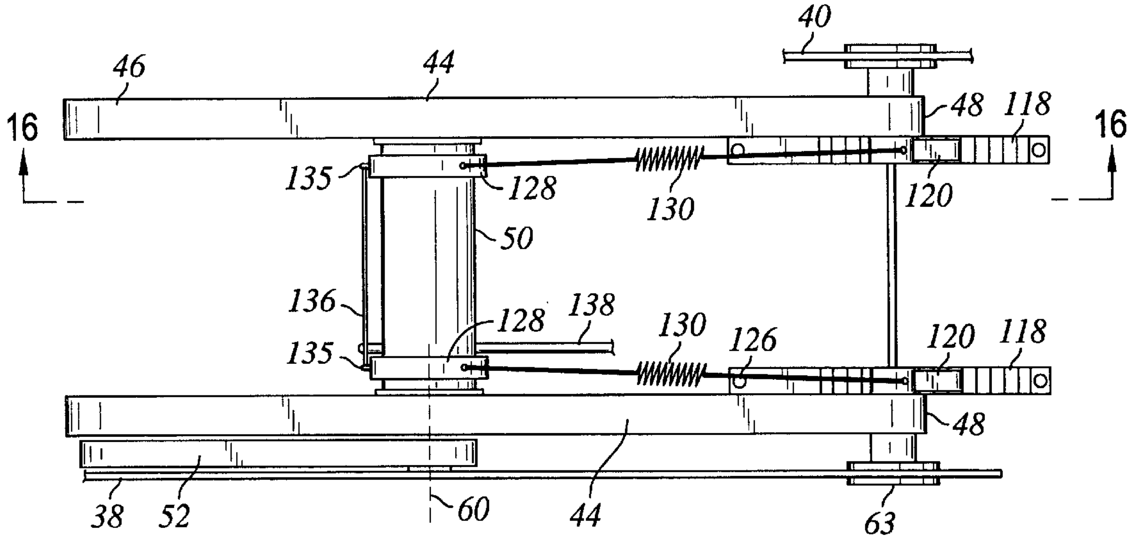
FIG. 15 is a top plan view of a portion of the power unit, showing a means for securing the rearward ends of the lift arms of a power unit, that is automatically engaged when the power unit is used without a jack stand.
Figure 16:
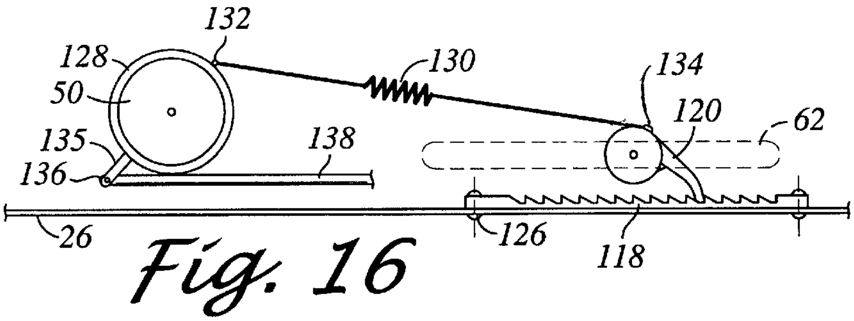
FIG. 16 is a sectional view taken along 16—16 of FIG. 15 showing the securing means automatically engaged.
Figure 17:
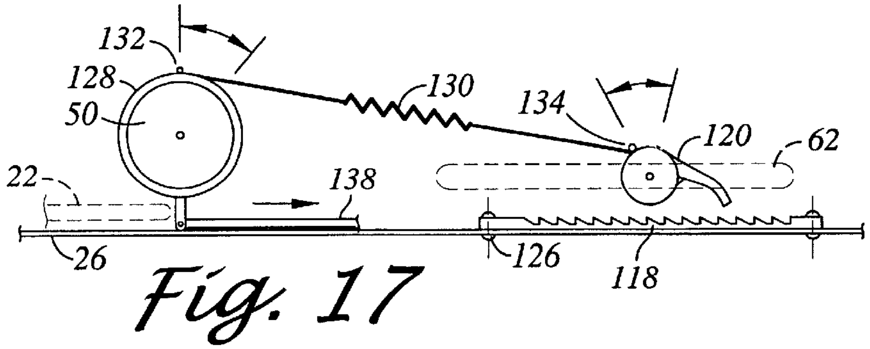
FIG. 17 is a sectional view, similar to FIG. 15, showing the securing means automatically disengaged by a jack stand (shown in phantom lines) actuating a control bar.

Referring to FIGS. 15–17, the securing mechanism is shown adapted to the power unit of the present invention to automatically lock the lift arm 44 against rearward translation within the slots 62 when the power unit is used as a jack and jack stand. As previously discussed, the securing mechanism can be adapted to only one lift arm, but is preferably adapted to both of the lift arms of the power unit. The toothed rack bars 118 are shown positioned adjacent to the retaining slots 62 in the flanges of the chassis, inboard of the lift arms 44 and are secured to the chassis 26 by suitable rivet fasteners 126. The mechanical dogs 120 are mounted coaxial with the rearward ends and axel 63 of the lift arms and are normally in contact with the teeth 122 of the bar (see FIG. 16) as previously discussed.

The securing mechanism is automated by a pair of slip rings 128 that are coaxially mounded around the lateral push bar 50 having a pair of tension springs 130 attached to the upper portion 132 thereof, and interconnected to an upper peripheral portion 134 of the dogs. The normal position of the slip rings is such that the tension springs are slack and fully contracted with no tension thereon, and the dogs are engaged with the toothed rack bar as shown in FIG. 16. The foregoing normal position corresponds to the power unit not engaged with a jack stand 22, and the bridge 24 is in the automatic slide forward position on the forward ends of the lift arms (see FIG. 3), and the power unit is adapted for use as a jack and jack stand. The power unit can thus be operated as a jack and raised to a desired level and positioned as a jack stand, as previously discussed, with the dogs automatically ratcheted forward within the teeth of the bar, and securely locked against any rearward movement of the lift arms.

The slip rings 128 include a linkage mechanism comprising a control lever 135 extending from the lower periphery of the slip rings, and interconnected by a control bar 136. When a jack stand 22 (see FIG. 4) is engaged into the chassis of the power unit, a portion of the base thereof (shown in phantom lines, 22) contacts the control bar 136 and rotates the slip rings about 45 degrees counter-clockwise (about one inch at the periphery thereof) and places the spring 130 in tension, and applies a corresponding rotational force of the periphery of the dog 120. However, if there is any rearward force on the dog, the dog remains forced into engagement in the tooth of the bar until the actuator is extended to slightly lift the load; then the tension of the spring is sufficient to rotate the dog, and thus the safety mechanism can not accidentally release the load. The slip rings can further include suitable stops (i.e. on the lift arm or chassis) to confine the range of rotation thereof to prevent any over extension of the spring 130.

It may also be convenient to manually release the safety mechanism when the power unit is being lowered or repositioned without a load. A suitable manual release is provided with a linkage 138 attached to the control bar 136, and extending to a suitable lever at the top of the handle assembly 34 (not shown).

While specific embodiments and examples of the present invention have been illustrated and described herein, it is realized that modifications and changes will occur to those skilled in the art. It is therefore to be understood that the appended claims are intended to cover all such modifications and changes as fall within the spirit and scope of the invention.

What is claimed is:

1. A safety mechanism for a hydraulic floor jack, the hydraulic floor jack including a generally rectangular chassis having a forward end and a rearward end, a pivotal lifting means mounted on the chassis including a pair of parallel lift arms interconnected by a lateral push bar and having forward ends and rearward ends with the forward ends adapted to be pivotable upward as the rearward ends are translated forward within the chassis, and with the forward ends adapted to be pivotable downward as the rearward ends are translated rearward within the chassis, and a hydraulic actuator adapted to push the lateral push bar and the rearward ends of the lift arms forward, and adapted to release the rearward ends of the lift arms rearward along the chassis, the safety mechanism comprising:

a toothed rack bar extending horizontally within the chassis adjacent to the rearward end of the lift arm; a mechanical dog pivotally mounted on the rearward end of the lift arm and adapted to be engageable with a corresponding tooth of said rack bar, for mechanically securing the rearward ends of the lift arms at a desired position within the chassis, whereby the lift arms are retained in the desired position independent of any push of the hydraulic actuator; and said dog further adapted to be releasable from said rack bar for releasing said mechanical securing means so that the rearward ends of the lift arms are translatable rearward.

2. The safety mechanism as in claim 1, wherein the teeth of said rack bar are inclined toward the forward end of the chassis, and said dog is adapted to be releasably engaged with said rack bar, whereby the rearward end of said lift arm is ratchetable forward on said rack bar, and means for releasing said dog from said rack bar.

3. The safety mechanism as in claim 2, wherein said releasing means further comprises, said dog having a release lever on an upper peripheral portion thereof; a tension spring having a free un-tensioned length interconnecting the release lever to a release actuation means, whereby a pull on said release actuator means tensions said spring so that said dog is releasable from said rack bar.

4. The safety mechanism as in claim 2, wherein said releasing means is adapted to automatically release said dog from said rack bar, further comprises a slip ring having an upper peripheral portion thereof and mounted coaxially on the lateral push bar; said dog having an upper peripheral portion thereof; a tension spring having a free un-tensioned length interconnecting the upper portion of said slip ring and the upper portion of said dog; said slip ring further including a control bar extending therefrom and adapted to be rotatable, whereby upon rotation of said slip ring, said spring is tensioned so that said dog is automatically releasable from said rack bar.

5. A safety mechanism and a hydraulic floor jack comprising:

a generally rectangular chassis having a forward end and a rearward end and a left flange and right flange extending upwardly from the chassis, with each flange having a longitudinal retainer means extending horizontally from the rearward end of the flange to about midway along the flange;

a lift arm assembly including a left lift arm and a right left arm acting in parallel having forward ends and rearward ends and interconnected near the midpoints thereof by a lateral pivotal push bar and with the respective rearward end of the lift arms slidably retained within the respective longitudinal retainer means of said flange; and with the forward ends of the lift arms extending toward the forward end of the chassis;

a left connecting arm and right connecting arm acting in parallel having forward ends and rearward ends with the respective forward ends of the connecting arms pivotally connected near the forward end of the respective flange, and with the respective rearward end of the connecting arms pivotally connected near the midpoint of the respective lift arm;

a hydraulic actuator having a rearward end pivotally mounted at the rearward end of the chassis, and having a forward end attached to the lateral pivotal push bar, and the hydraulic actuator adapted to be extendable whereby the forward ends of the lift arms are raised and the rearward ends of the lifting arms are translated forward along the longitudinal retainer means of the respective flange;

a toothed rack bar extending horizontally within the chassis and adjacent to the longitudinal retainer means;

a mechanical dog pivotally mounted on the rearward end of the lift arm and adapted to be engagable with a corresponding tooth of the rack bar to mechanically secure the rearward end of the lift arm to the chassis independent of force of the hydraulic actuator, and the dog further adapted to be releasable from the rack bar so that the rearward end of the lift arms can be translated rearward.

6. The safety mechanism and hydraulic floor jack as defined in claim 5, wherein said longitudinal retainer means comprises the flange having a slot therein.

7. The hydraulic floor jack as defined in claim 5, wherein said longitudinal retainer means comprises the flange having a channel therein.

* * * * *